Figure 1:
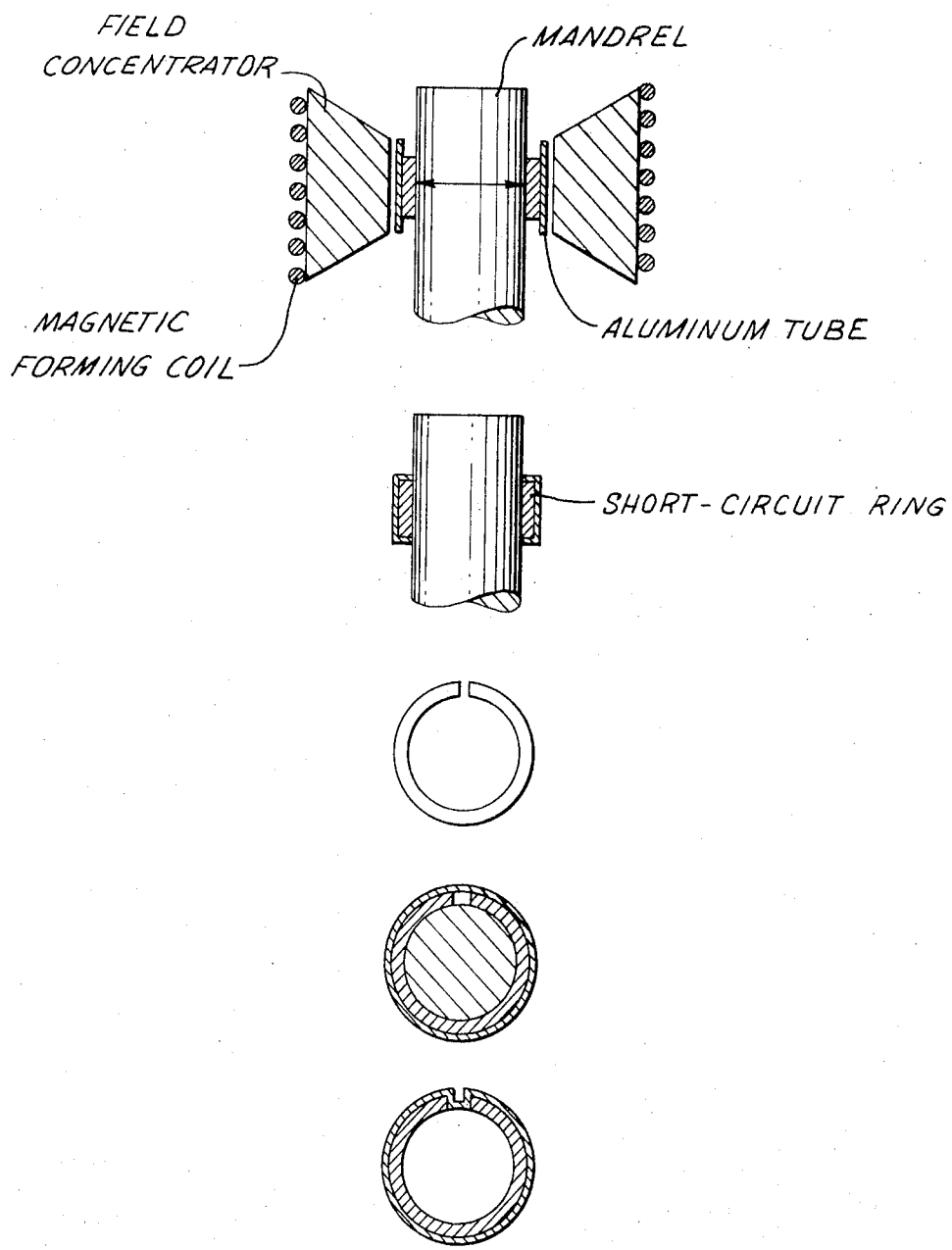

United States Patent [19]
Lippmann et al.

[11] 3,733,688
[45] May 22, 1973

[54] METHOD OF MANUFACTURE OF SHORT-CIRCUIT RINGS

[75] Inventors: Hans-Joachim Lippmann, Boxdorf; Horst Schenk, Erlangen, both of Germany

[73] Assignee: Siemens Aktiengesellschaft, Berlin, Germany

[22] Filed: Jan. 23, 1970

[21] Appl. No.: 5,203

[30] Foreign Application Priority Data

Jan. 30, 1969  Germany.....................P 19 04 402.1

[52] U.S. Cl. .........................29/523, 29/428, 29/515
[51] Int. Cl. .............................................B23p 11/00
[58] Field of Search......................29/592, 629, 624, 29/522, 523, 505, 508, 515; 72/56 M, 54, 56, 58

[56] References Cited

UNITED STATES PATENTS

| | | | |
|---|---|---|---|
| 3,396,460 | 8/1968 | Wetmore | 29/629 |
| 3,443,305 | 5/1969 | Matsuda et al. | 29/592 |
| 3,196,529 | 7/1965 | Schwinghamer | 72/54 |

*Primary Examiner*—Charles W. Lanham
*Assistant Examiner*—D. C. Crane
*Attorney*—Curt M. Avery, Arthur E. Wilfond, Herbert L. Lerner and Daniel J. Tick

[57] ABSTRACT

A slit ring is rolled from a band of metal to a diameter which deviates from a desired diameter. The slit ring is clamped to maintain it at a desired diameter. A tube is fitted to the inner or outer surface of the ring. The tube is fitted to the ring by electromagnetic forming and the ring is unclamped after the fitting of the tube.

8 Claims, 2 Drawing Figures

METHOD OF MANUFACTURE OF SHORT-CIRCUIT RINGS

DESCRIPTION OF THE INVENTION:

The invention relates to a method of manufacture of short-circuit rings. More particularly, the invention relates to a method of manufacture of short-circuit rings having exact diameters for magnetic flux return in permanent magnet motors.

In motors having permanent magnets the magnetic flux is returned via iron yoke rings. In order to maintain the tolerance of the working air coil small and to utilize the magnetic flux almost completely, it is necessary to adjust the iron yoke ring to the magnets in a satisfactory manner. The yoke ring utilized for this purpose comprises a slit ring which is rolled from an iron band. The maintenance of the diameter of the ring, which is important to the operation of the motor, is not easy to accomplish, due to the spring action of said ring. A subsequent clamping or grinding of the rolled ring would be very expensive.

A principal object of the invention is to provide a new and improved method of manufacture of short-circuit rings.

An object of the invention is to provide a simple method of manufacture of short-circuit rings.

An object of the invention is to provide a method of manufacture of short-circuit rings which produces rings having accurate desired diameters.

In accordance with the present invention, a method of manufacture of short-circuit rings having exact diameters for magnetic flux return in permanent magnet motors comprises rolling a slit ring from a band of metal of a diameter which deviates from a desired diameter. The slit ring is clamped to maintain it at a desired diameter. A tube is fitted to the inner or outer surface of the ring. The tube is fitted to the surface of the ring by high speed forming.

The slit ring is rolled from an iron band. The ring is clamped to a mandrel in opposition to its spring tension to provide a desired inner diameter. An aluminum tube is fitted on the outer surface of the clamped ring. The aluminum tube is fitted on the outer surface of the clamped ring by electromagnetic forming.

The ring is rolled from an iron band. The ring is clamped to a desired outer diameter and is fitted into a tube which maintains the ring at its desired outer diameter. An aluminum tube is fitted into the ring. The aluminum tube is fitted into the ring by electromagnetic forming. The ring is unclamped after the aluminum tube is fitted thereto.

Figure 2:
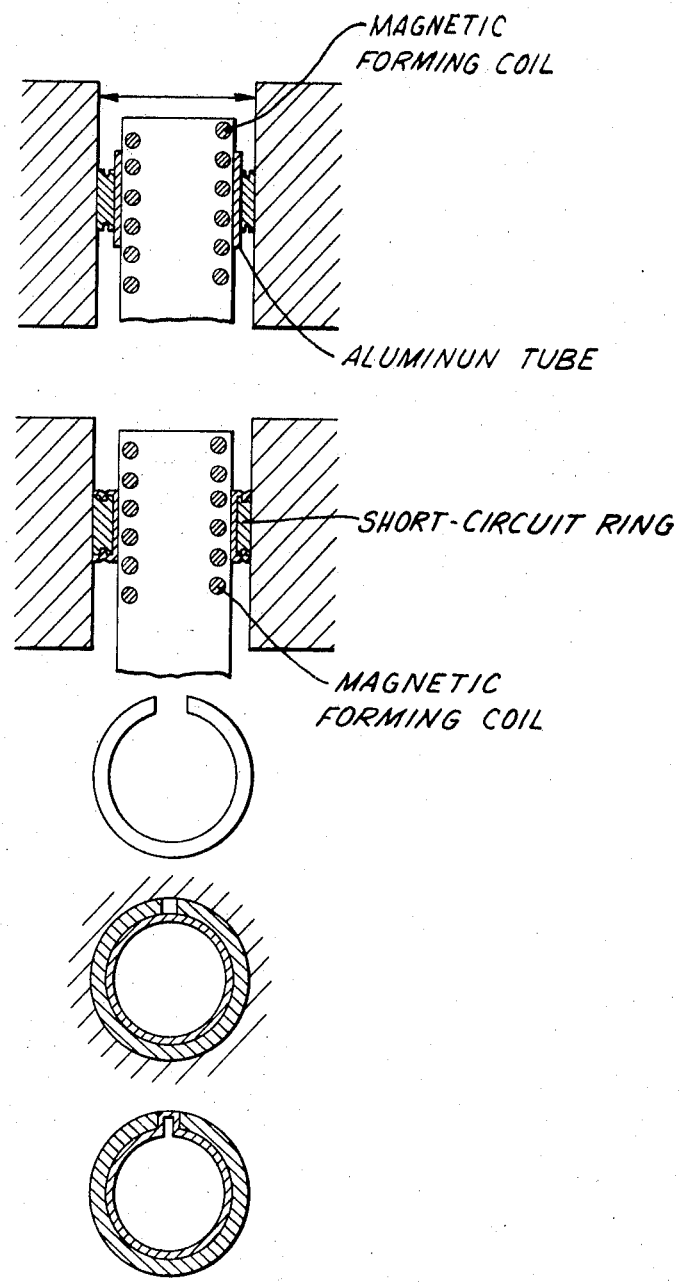

In order that the invention may be readily carried into effect, it will now be described with reference to the accompanying drawings, wherein:

FIGS. 1 and 2 illustrate the various steps of the method of the invention.

High speed forming methods include, for example, the hydrospark method and the method in which high pulsed magnetic fields are utilized. In the hydrospark method, workpieces are formed by pressure waves produced by underwater spark discharges of a battery of capacitors via a discharge circuit having a spark gap. The hydrospark method is disclosed on pages 102 to 106 of Mitteilung Forschungsgesellschaft Blechverarbeitung, 1965. The high pulsed magnetic field method is disclosed in German Pat. No. 1,122,188. In this method, a current which alternates rapidly relative to time, in work coils which either surround the workpiece or are enclosed by the workpiece, induces Eddy currents in the workpiece. The alternating action of the Eddy currents with the magnetic field of the work coil initiates the forming forces.

In an embodiment example of the method of the invention, in order to manufacture a short-circuit ring having an exact inner diameter, a slit ring is rolled from an iron band. The rolled slit ring has a diameter which is not the desired diameter. The ring is subsequently clamped, with the assistance of a mandrel, peg, pin, or the like, in opposition to its spring tension, to a desired diameter. The clamp maintains the slit ring at the desired diameter.

A tube of metal which has good electrical conductivity such as, for example, copper or aluminum, is then fitted onto the clamped ring, so that said tube surrounds said ring. The clamped ring and the surrounding fitted tube are then placed within an air coil. A battery of capacitors is discharged via the air coil to produce a resultant magnetic field which induces Eddy currents in the aluminum tube. The alternating action of the Eddy currents and the magnetic field of the air coil produce a compression of the aluminum tube, so that said tube is pulled into the slot or gap of the ring.

The forming of the outer aluminum tube to the inner clamped slit ring maintains said ring in its clamped or tensioned condition and maintains the desired inner diameter of said ring, after the clamp is removed.

An exact outer diameter is provided by inserting the slit ring, when clamped, into a tube and by then fitting an aluminum tube into said ring and forming said aluminum tube with said ring by electromagnetic expansion.

While the invention has been described by means of specific examples and in specific embodiments, we do not wish to be limited thereto, for obvious modifications will occur to those skilled in the art without departing from the spirit and scope of the invention.

We claim:

1. A method of manufacture of short-circuit rings having exact diameters for magnetic flux return in permanent magnet motors, said method comprising the steps of
   rolling a slit ring from a band of metal to a diameter which deviates from a desired diameter;
   clamping the slit ring to maintain it at a desired diameter; and
   fitting a tube to the inner or outer surface of the ring by high-speed electromagnetic forming.

2. A method of manufacture of short-circuit rings having exact diameters for magnetic flux return in permanent magnet motors, said method comprising the steps of
   rolling a slit ring from a band of metal to a diameter which deviates from a desired diameter;
   clamping the slit ring to maintain it at a desired diameter; and
   fitting a tube to the inner or outer surface of the ring by high-speed forming.

3. A method of manufacture of short-circuit rings having exact diameters for magnetic flux return in permanent magnet motors, said method comprising the steps of
   rolling a slit ring from a band of iron to a diameter which deviates from a desired diameter;

clamping the slit ring to a mandrel in opposition to its spring tension to provide a desired inner diameter; and fitting an aluminum tube to the outer surface of the clamped ring.

4. A method of manufacture of short-circuit rings as claimed in claim 1, wherein the ring is rolled from an iron band, the ring is clamped to a desired outer diameter and is fitted into a tube which maintains the ring at its desired outer diameter, and an aluminum tube is fitted into the ring.

5. A method of manufacture of short-circuit rings as claimed in claim 3, wherein the aluminum tube is fitted on the outer surface of the clamped ring by high-speed electromagnetic forming.

6. A method of manufacture of short-circuit rings as claimed in claim 5, further comprising the step of unclamping the ring after the aluminum tube is fitted thereto.

7. A method of manufacture of short-circuit rings having exact diameters for magnetic flux return in permanent magnet motors, said method comprising the steps of rolling a slit ring from a band of metal to a diameter which is greater than a given diameter;

inserting the slit ring into a tube having an inner diameter equal to the given diameter; and fitting a tube to the inner surface of the ring by high-speed forming.

8. A method as claimed in claim 7, wherein the tube fitted to the inner surface of the ring is aluminum.

* * * * *